United States Patent [19]
Duckworth

[11] 3,836,295
[45] Sept. 17, 1974

[54] TEMPERATURE COMPENSATED GEAR PUMP WITH TRAVEL LIMITED WEARBLOCK

[75] Inventor: Allen Duckworth, Newington, Conn.

[73] Assignee: Chandler Evans Inc., West Hartford, Conn.

[22] Filed: Aug. 29, 1973

[21] Appl. No.: 392,666

[52] U.S. Cl. .............................. 418/126, 418/129
[51] Int. Cl. .... F01c 19/02, F04c 15/00, F04c 27/00
[58] Field of Search ............................. 418/125–129

[56] References Cited
UNITED STATES PATENTS
2,622,534 12/1952 Johnson .............................. 418/126
3,597,131 8/1971 Schofield ............................ 418/126

Primary Examiner—John J. Vrablik
Attorney, Agent, or Firm—R. W. Luther; R. A. Dornon

[57] ABSTRACT

A gear pump has a peripheral tooth-sealing member with arcuate wiping surfaces to engage the respective teeth of the gears. The sealing member is positioned adjacent the outlet of the pump and is capable of only limited movement toward the gears due to a stop element anchored to the housing. The coefficient of thermal expansion and the length of the stop element are selected to compensate for thermal expansions of the housing sealing member(s) and gears so that a constant gap is maintained between the wiping surfaces and the teeth of the gears.

1 Claim, 2 Drawing Figures

PATENTED SEP 17 1974　　3,836,295
FIG_1
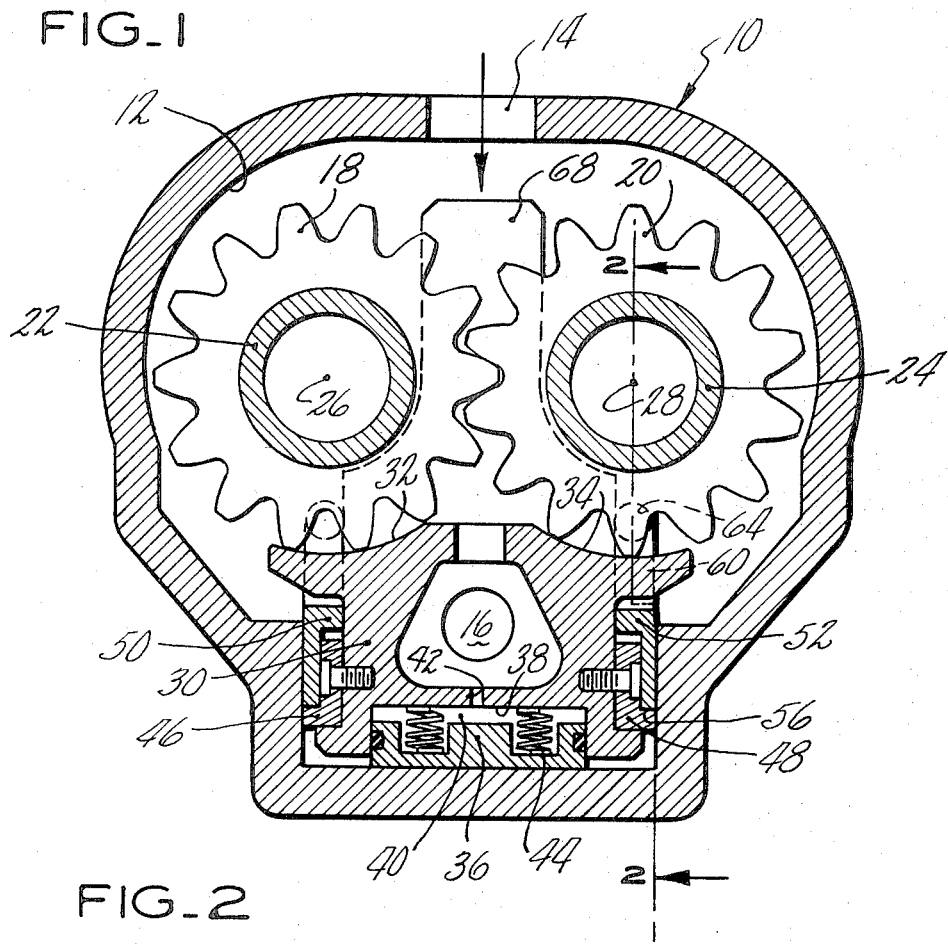
FIG_2
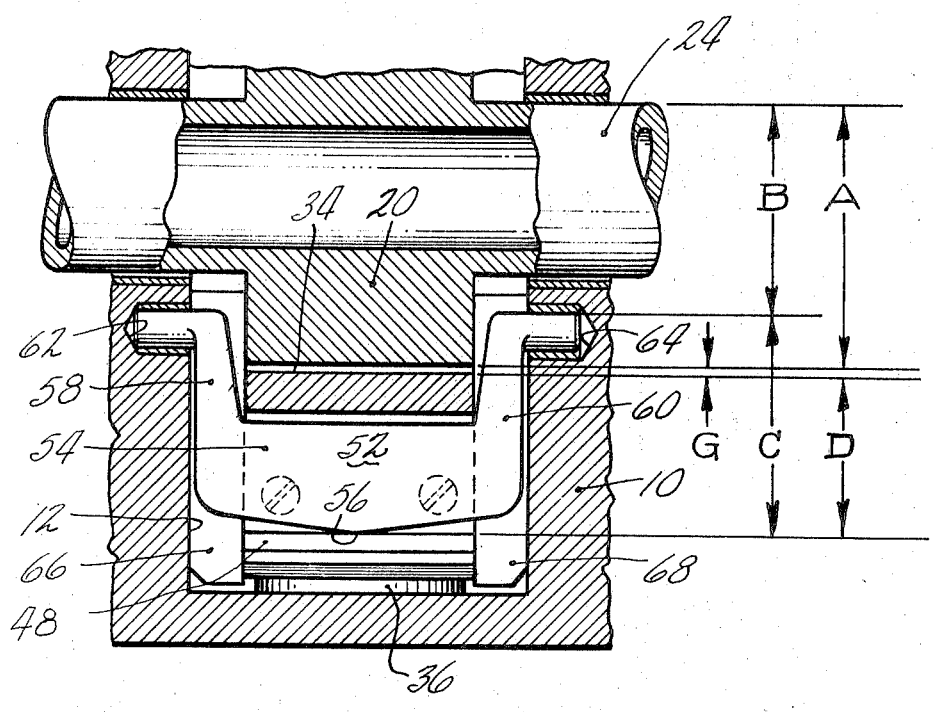

TEMPERATURE COMPENSATED GEAR PUMP WITH TRAVEL LIMITED WEARBLOCK

BACKGROUND OF THE INVENTION

This invention relates to gear pumps having peripheral tooth-sealing members and more particularly to gear pumps having peripheral tooth-sealing members which are travel-limited in their movement toward the gears.

U.S. Pat. No. 3,597,131, discloses a gear pump incorporating a sealing member which is mounted for limited movement relative to the gears such that wear upon the wiping surfaces of the sealing member is restricted to break-in wear. A pump as shown in the aforementioned patent may typically incorporate steel gears, bronze or aluminum sealing members, and an aluminum housing. An inherent characteristic of this construction is that the gap between the gear tips and the wiping surfaces of the sealing member increases at high temperatures, whereas at very low temperatures, interference between the teeth and the wiping surfaces occasions further wear. It would be desirable from the standpoint of pump efficiency to provide a means to compensate for the above thermal expansion effects.

SUMMARY OF THE INVENTION

The invention provides temperature compensation for a gear pump having a travel-limited sealing mmber in order to maintain a constant gap or clearance between the tips of the teeth and the wiping surfaces of the sealing member during temperature variations. The heart of the invention is an extended sealing member stop element which is anchored relatively close to the gear centerline. The effective length and coefficient of thermal expansion of the stop element are selected so that its expansion or contraction due to a temperature increase or decrease compensates for the dimensional variations of the housing, gears and sealing member, whereby to maintain a relatively constant clearance or gap between the gear tips and the wiping surfaces of the sealing member at all temperatures.

Accordingly, it is a primary object of the invention to provide a gear pump having a travel-limited sealing member wherein temperature variations do not beget a change in the clearance between the gears and the sealing member.

This and other objects and advantages of the invention will become more readily apparent from the following detailed description taken in conjunction with the accompanying drawings, in which:

BRIEF DESCRIPTION OF THE DRAWINGS

FIG. 1 is a schematic side elevational view of a gear pump incorporating a peripheral tooth-sealing assembly according to the invention.

FIG. 2 is a fragmentary sectional view of the pump of FIG. 1, taken along the line 2—2 of FIG. 1.

DETAILED DESCRIPTION OF PREFERRED EMBODIMENT

In FIG. 1, there is shown a pump which is similar in construction to that shown in U.S. Pat. No. 3,597,131. The pump of FIG. 1 comprises a housing 10 having a pumping cavity 12 defined therein which fluidly communicates with an inlet 14 and an outlet 16. Gears 18 and 20 are mounted upon shafts 22 and 24 respectively for rotation therewith. Each gear and shaft assembly may be formed from a single piece of material or may be constituted by a separate shaft and a separate gear joined by appropriate means. The shafts 22 and 24 are journaled in bearings in the housing 10 such that the axes of rotation 26 and 28 are maintained substantially parallel and the gears 18 and 20 are in meshing engagement. One of the shafts 22 and 24 is connected to a means (not shown) for driving the pump depicted in FIG. 1. Gears 18 and 20 are arranged within the pumping cavity 12 such that the inlet 14 supplies fluid to the inlet side of the gears and the outlet 16 receives fluid from the discharge side of the gears.

A peripheral tooth-sealing member 30 is positioned in the cavity 12 at the discharge side of the gears 18 and 20. The peripheral tooth-sealing member 30 has two arcuate wiping surfaces 32 and 34 to substantially engage the tips of at least two teeth of the respective gears for preventing leakage of the high pressure fluid from the discharge side of the gears back to the inlet side of the gears. A sealing spacer 36, positioned beneath the sealing member 30, is received within a cavity 38 in the base of the sealing member 30 to form a variable volume chamber 40 which communicates with discharge pressure via an orifice 42. Interposed between the sealing member 30 and the sealing spacer 36 are a plurality of springs 44 for continuously urging the sealing member 30 toward the gears. The pressure in the variable volume chamber 40, which also urges the sealing member 30 toward the gears, exerts a discharge pressure-responsive force upon the sealing member 30 to supplement that provided by springs 44. to the lateral sides of the sealing member 30 are secured channel members 46 and 48 for functioning as contact elements to limit travel of the sealing member 30 toward the gears 18 and 20. The contact elements 46 and 48 are urged into abutting relationship with a pair of stop elements 50 and 52 by the force imparted to the sealing member 30 by springs 44 and the pressure and variable volume chamber 40.

The relationship between the stop elements and contact elements as well as the construction of the stop elements 50 and 52 can best be understood by reference to both FIGS. 1 and 2. Attention should be directed to stop element 52 which is identical to stop element 50 in construction and the manner of its mounting to the housing 10. Stop element 52 is secured to the housing 10 such that it is located at the centerline of the gear and extends across the lower portion of the pumping cavity 12. The stop element 52 comprises a base segment 54 which defines the stop surface 56 which abuts the channel member 48. The base segment 54 is carried by L-shaped legs 58 and 60, the extremities of which are inserted into bores 62 and 64 which respectively may include suitable bushings. The underlying rationale for providing a stop surface 56 which acts as a fulcrum is to permit limited pivoting of the sealing member 30 about an axis transverse to the axes of rotation of the gears, whereby a tight seal between the side members 66 and 68 is assured and greater manufacturing tolerances are permitted. However, it will be appreciated that the invention is not limited to pumps which incorporate side members and pivotable sealing members. Moreover, although the disclosed pump is adapted to be broken-in in the manner set forth in U.S. Pat. No. 3,597,131 it will be understood that the invention is not limited in application to such pumps where a break-in period is required.

For the purposes of describing the invention, assume that the housing 10 is made of aluminum, that the gears and shafts are made of tool steel and that the sealing member 30 is made of an aluminum bronze alloy. The problem then is to maintain a constant clearance between the wiping surfaces of the sealing member 30 and the peripheries of the respective gears at all operating temperatures. The critical distances or dimensions are indicated on FIG. 2 which is a cross section taken at the centerline of gear 20. For computational purposes, it should be noted that the cross section need not be taken on the centerline of the gear but that the invention may best be practiced by this method. The dimensions designated in FIG. 2 by the letters A through G are as follows:

A is the distance from the top of the shaft 24 (which contacts the top of the bearing along a line of contact) to the lowermost periphery of the gear;

B is the distance from the top of the bearing to the location at which the stop element 52 is anchored;

C is the distance (or effective length of the stop element) from the location at which the stop element is anchored to the surface 56 which engages the contact element;

D is the distance from the contact element 48 to the wiping surface 34; and

G is the desired gap between the wiping surface 34 and the gear periphery which is intended to be held constant.

With the continued reference to FIG. 2, the gap G between the wiping surface 34 and the periphery of the gear 20 at the indicated sectional may be expressed by the following equation:

$$G = B + C - D - A \quad (1)$$

Wherein G would preferably be equal to 0 but may be of a small magnitude. Assuming the pump is subjected to a temperature change $\Delta T$, the gap may expand or narrow an amount designated $\Delta G$. $\Delta G$ may be found from the following equation:

$$G + \Delta G = B + K_1 B \Delta T + C + K_2 C \Delta T - D - K_3 D \Delta T - A - K_4 A \Delta T \quad (2)$$

Wherein $K_1$, $K_2$, $K_3$, $K_4$ are respectively the coefficients of thermal expansion of the housing, the stop element, the sealing member, and the gear. Hence, the change in the gap G for a temperature change equal to $\Delta T$ may be expressed as follows:

$$\Delta G = K_1 B \Delta T + K_2 C \Delta T - K_3 D \Delta T - K_4 A \Delta T \quad (3)$$

Obviously, in order to hold a constant gap, $\Delta G$ must equal zero whereby the following equation governs:

$$0 = K_1 B + K_2 C - K_3 D - K_4 A \quad (4)$$

Rewriting equation (4):

$$K_2 C = K_3 D + K_4 A - K_1 B \quad (5)$$

It should be apparent from equation 5 that an essentially constant gap between the wiping faces and the peripheries of the gears would be maintained if the product of the stop elements effective length and its coefficient of thermal expansion equaled the number on the right side of equation 5. Since the dimensions A, D and G, as well as the coefficients of thermal expansion $K_1$, $K_4$, $K_3$, will, in all likelihood, be dictated by controlling design considerations, the instant analysis may be simplified by letting the number $A + D + G$, which is known, be represented by the character $N_1$, i.e.:

$$N_1 = A + D + G \quad (6)$$

And let the known sum of $K_3 D + K_4 A$ be designated by the number $N_2$, i.e.:

$$N_2 = K_3 D + K_4 A \quad (7)$$

It will be appreciated that the quantities $N_1$ and $N_2$ are fixed and known because the dimensions A, D, and G and the coefficients $K_3$ and $K_4$ have been predetermined. Equation 5 can now be rewritten as follows:

$$B (K_1 - K_2) = N_2 - K_2 N_1 \quad (8)$$

Utilizing equation 8, various values of B may be substituted therein to determine the coefficient of expansion $K_2$, or alternatively, various coefficients of expansion may be substituted in the equation to ascertain the dimension B. It should also be apparent from equation 5 that once B is known, C is also known. In summary then, equation 8 expresses the appropriate relationship between the dimension D and the coefficient $K_2$ for a pump having a constant gap between the periphery of the gears and the wiping surfaces of the sealing member.

The invention has been incorporated in a pump as shown in the aforementioned U.S. patent and it has been found that clearance variations have been reduced by a factor of 10, thereby significantly contributing to pump performance and prolongation of service life.

Obviously many variations and modifications of the invention are possible in light of the above teachings without departing from the spirit and scope of the invention as defined in the appended claims.

What I claim is:

1. A gear pump comprising:
   a housing having a pumping cavity therein and an inlet and an outlet in fluid communication therewith;
   two parallel spaced shafts journaled in the housing for rotation in the pumping cavity;
   two intermeshing gears respectively mounted upon the shafts to pump fluid from the inlet toward the outlet;
   a peripheral tooth-sealing member mounted in the pumping cavity adjacent the outlet and below the gears for movement toward and away from the gears, the sealing member having two arcuate wiping surfaces to substantially engage the respective peripheries of the gears;

a contact element integral with the sealing member;

a stop element anchored to the housing and disposed within the cavity such that it engages the contact element for preventing the sealing member from advancing toward the gears, the stop element having an effective length and a coefficient of thermal expansion sufficient to expand and contract the extent necessary to maintain a constant gap between the wiping surfaces and the respective gear peripheries when the pump is subjected to temperature changes.

* * * * *